(12) United States Patent
Tani et al.

(10) Patent No.: US 11,621,736 B2
(45) Date of Patent: Apr. 4, 2023

(54) DATA PROCESSING DEVICE, TRANSMISSION DEVICE, RECEPTION DEVICE, ARTIFICIAL SATELLITE, AND DATA PROCESSING METHOD

(71) Applicant: Mitsubishi Electric Corporation, Tokyo (JP)

(72) Inventors: Shigenori Tani, Tokyo (JP); Yasutaka Yamashita, Tokyo (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 0 days.

(21) Appl. No.: 17/672,347

(22) Filed: Feb. 15, 2022

(65) Prior Publication Data

US 2022/0173757 A1 Jun. 2, 2022

Related U.S. Application Data

(63) Continuation of application No. PCT/JP2019/042019, filed on Oct. 25, 2019.

(51) Int. Cl.
*H04B 1/10* (2006.01)
*H04B 7/185* (2006.01)

(52) U.S. Cl.
CPC ......... *H04B 1/1027* (2013.01); *H04B 1/1081* (2013.01); *H04B 7/18508* (2013.01)

(58) Field of Classification Search
CPC .................................................. H04B 1/1027
See application file for complete search history.

(56) References Cited

U.S. PATENT DOCUMENTS

| | | | | |
|---|---|---|---|---|
| 6,570,863 | B1* | 5/2003 | Kim | H04B 1/7097 370/335 |
| 2002/0186375 | A1* | 12/2002 | Asbury | G01N 21/21 356/440 |
| 2007/0019281 | A1* | 1/2007 | Mirell | G02F 2/00 359/325 |
| 2019/0362472 | A1* | 11/2019 | Takeshima | G06T 5/001 |
| 2020/0278395 | A1* | 9/2020 | Herd | G01R 31/31724 |

FOREIGN PATENT DOCUMENTS

| | | |
|---|---|---|
| JP | 63-261480 A | 10/1988 |
| JP | 2010-239600 A | 10/2010 |

OTHER PUBLICATIONS

"Space product assurance, Techniques for radiation effects mitigation in ASICs and FPGAs handbook", ECSS-Q-HB-60-02A, Sep. 1, 2016, total 236 pages.

(Continued)

*Primary Examiner* — Hsinchun Liao
(74) *Attorney, Agent, or Firm* — Birch, Stewart, Kolasch & Birch, LLP

(57) ABSTRACT

A data processing device includes a restoration unit that performs a conversion operation on an input signal to convert the input signal into a signal having no distortion caused by an external factor, and a selection unit that selects and outputs either an unrestored signal, which is the input signal, or a restored signal, which is a signal obtained by the restoration unit by performing the conversion operation, based on a feature quantity of the unrestored signal and on a feature quantity of the restored signal.

18 Claims, 6 Drawing Sheets

(56) References Cited

OTHER PUBLICATIONS

Dong et al., "Image Super-Resolution Using Deep Convolutional Networks", arXiv: 1501.00092v3 [cs.CV], Jul. 31, 2015, total 17 pages.
International Search Report for PCT/JP2019/042019 dated Jan. 21, 2020.
Written Opinion of the International Searching Authority for PCT/JP2019/042019 dated Jan. 21, 2020.

\* cited by examiner

DATA PROCESSING DEVICE, TRANSMISSION DEVICE, RECEPTION DEVICE, ARTIFICIAL SATELLITE, AND DATA PROCESSING METHOD

CROSS-REFERENCE TO RELATED APPLICATION

This application is a continuation application of International Application PCT/JP2019/042019, filed on Oct. 25, 2019, and designating the U.S., the entire contents of which are incorporated herein by reference.

BACKGROUND OF THE INVENTION

1. Field of the Invention

The disclosure relates to a data processing device, a transmission device, a reception device, an artificial satellite, and a data processing method each for restoring and outputting a signal when a software error occurred in a digital circuit.

2. Description of the Related Art

Growing demand for a large amount of data communication requires communication infrastructure facilities such as a cellular system and a satellite communication system to be capable of high-speed data transmission. In addition, a relay installed in a conventional artificial satellite performs frequency conversion by an analog circuit on a signal received by the artificial satellite, and then transmits the resulting signal to a ground-based device. This presents a problem in that it is difficult to handle a change in communication demand in each area once the artificial satellite was launched. Thus, attention is paid to a digital payload artificial satellite including a relay including a device such as an application specific integrated circuit (ASIC) or a field programmable gate array (FPGA) to control as desired the frequency of the relayed signal, the destination of the relayed signal, and the like through digital signal processing to increase flexibility.

A device that provides digital signal processing may experience a software error such as inversion of the value of a bit in an internal circuit caused by a cosmic ray in the cosmic space. For example, a software error that has occurred in a communication device may lead to an increase in instantaneous noise and/or emission of a useless radio wave in an undesired frequency band. For this reason, artificial satellites often use a dedicated device for space use, more resistant to a cosmic ray. Meanwhile, a consumer device widely used on the ground is less resistant to a cosmic ray than a device for space use, but provides high performance due to its fine design, and is available at low cost. Therefore, use of a consumer FPGA in space applications is expected to achieve higher performance and lower cost of a satellite. As conventional techniques for mitigating software errors, "Space product assurance, Techniques for radiation effects mitigation in ASICs and FPGAs handbook", ECSS-Q-HB-60-02A, 1 Sep. 2016 of Non-Patent Literature 1, discloses methods for correcting an error using triple redundancy and majority decision, scrubbing to periodically overwrite data in a circuit, and a correction method using an error correction code.

However, use of the methods using triple redundancy and majority decision and the method using an error correction code described in Non-Patent Literature 1 will increase the circuit size due to its redundant configuration. In addition, due to being a periodic correction method, scrubbing is not capable of correcting an error within a period, and may therefore induce communication errors in bursts.

SUMMARY OF THE INVENTION

In order to solve the above problem and achieve the object, a data processing device according to the disclosure includes: a restoration unit to perform a conversion operation on an input signal to convert the input signal into a signal having no distortion caused by an external factor; and a selection unit to select and output either an unrestored signal or a restored signal based on a feature quantity of the unrestored signal and on a feature quantity of the restored signal, the unrestored signal being the input signal, the restored signal being a signal obtained by the restoration unit by performing the conversion operation.

DETAILED DESCRIPTION OF THE PREFERRED EMBODIMENTS

A data processing device, a transmission device, a reception device, an artificial satellite, and a data processing method according to embodiments of the disclosure will be described in detail below with reference to the drawings.

First Embodiment

Figure 1:
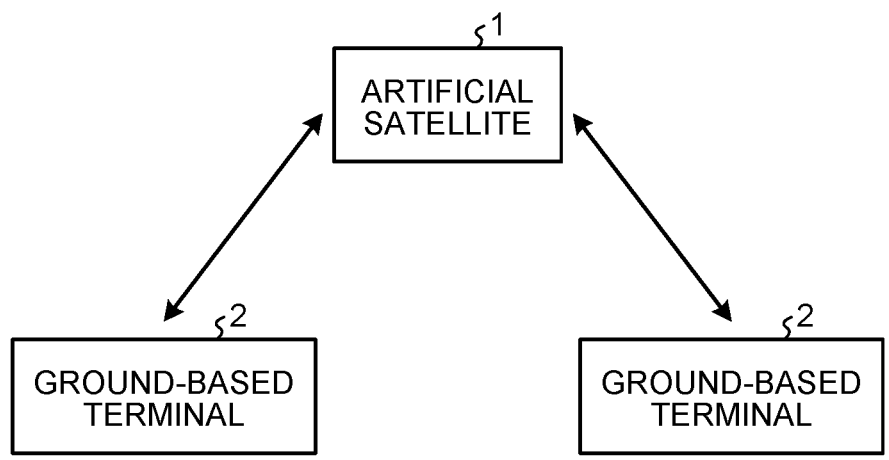
FIG. 1 is a diagram illustrating an example configuration of a satellite communication system that uses a data processing device according to a first embodiment.

FIG. 1 is a diagram illustrating an example configuration of a satellite communication system that uses a data processing device according to a first embodiment. The satellite communication system illustrated in FIG. 1 is configured to include an artificial satellite 1 having wireless communication functionality, and ground-based terminals 2, which are each located on the ground and perform communication via the artificial satellite 1. The satellite communication system may include three or more of the ground-based terminals 2.

The data processing device according to the first embodiment is installed, for example, in the artificial satellite 1 to restore correct data when a software error occurred during data processing performed in the artificial satellite 1.

Figure 2:
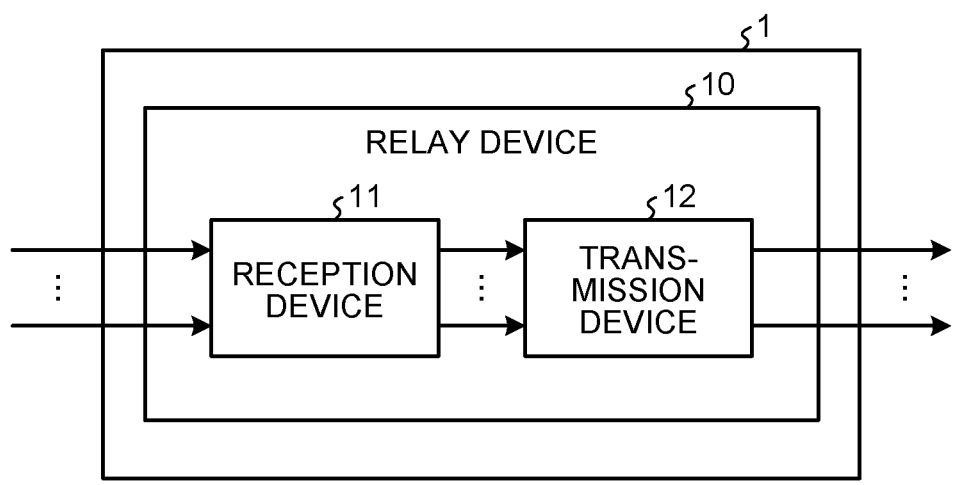
FIG. 2 is a diagram illustrating an example configuration of the artificial satellite that uses the data processing device according to the first embodiment.

FIG. 2 is a diagram illustrating an example configuration of the artificial satellite 1, which uses the data processing device according to the first embodiment. The artificial satellite 1 includes a relay device 10 configured to include a reception device 11 and a transmission device 12. In the relay device 10, the reception device 11 receives a wireless signal transmitted by a first ground-based terminal 2 of the multiple ground-based terminals 2. The transmission device 12 receives the signal received by the reception device 11, and transmits the signal to a second ground-based terminal 2 of the multiple ground-based terminals 2. The data processing device according to the first embodiment is applicable to any of the reception device 11 and the transmission device 12.

Figure 3:
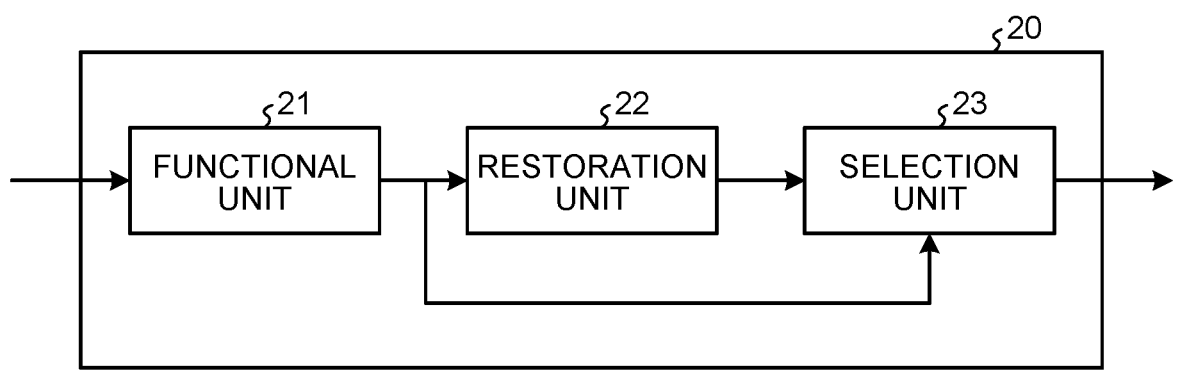
FIG. 3 is a diagram illustrating an example configuration of the data processing device according to the first embodiment.

FIG. 3 is a diagram illustrating an example configuration of a data processing device 20 according to the first embodiment. The data processing device 20 according to the first embodiment includes a functional unit 21, a restoration unit 22, and a selection unit 23.

The functional unit 21 performs a computational operation required of the device that uses the data processing device 20. That is, the computational operation performed by the functional unit 21 varies depending on the device that uses the data processing device 20. For example, in a case in which the data processing device 20 is used in the transmission device 12 of FIG. 2, the functional unit 21 performs the types of computational operation needed to implement the transmission device 12 such as encoding and modulation of transmission data. Alternatively, in a case in which the data processing device 20 is used in the reception device 11 of FIG. 2, the functional unit 21 performs the types of computational operation needed to implement the reception device 11 such as demodulate and decoding of a reception signal. In the present embodiment, the functional unit 21 performs a computational operation for implementing general functionality of a reception device and of a transmission device of a relay device included in a conventional artificial satellite. That is, the computational operation itself performed by the functional unit 21 does not have any characteristics. Detailed description of the computational operation performed by the functional unit 21 will therefore be omitted.

The functional unit 21 outputs a signal, and the signal is input to the restoration unit 22 and to the selection unit 23. At this stage, the signal output by the functional unit 21 may have changed from a normal state due to an external factor such as noise or a software error, that is, may be subjected to waveform distortion.

The restoration unit 22 performs a restoration operation, which is a conversion operation performed on an input signal from the functional unit 21 to bring the signal that have changed due to an external factor into an unchanged signal or into a little changed signal in a normal state. The restoration unit 22 outputs a signal obtained by performing the restoration operation on the input signal, to the selection unit 23.

A method of implementing the restoration unit 22 will next be described. The restoration unit 22 is implemented in a network that has learned the conversion method in advance. The network for implementing the restoration unit 22 may be, for example, a denoising autoencoder, which is a sort of neural network.

Figure 4:
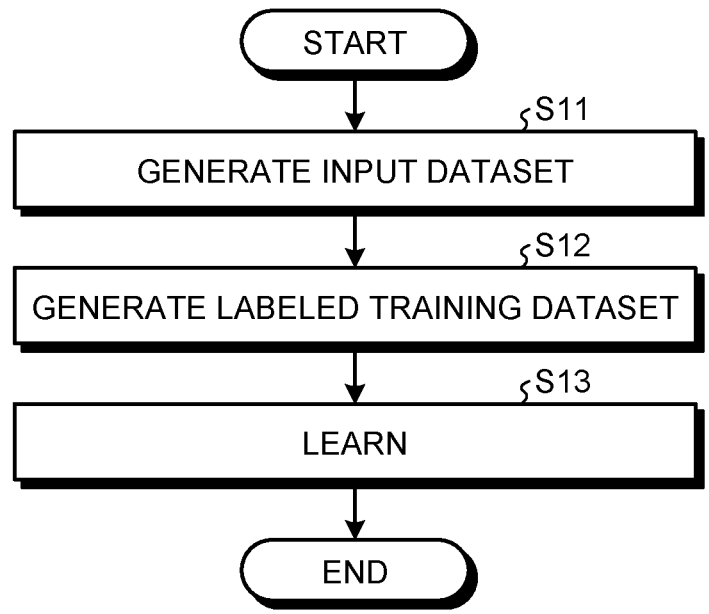
FIG. 4 is a flowchart illustrating a learning procedure for obtaining a learning result to be used by the data processing device according to the first embodiment.

A process of learning the conversion method will now be described with reference to FIG. 4. FIG. 4 is a flowchart illustrating a learning procedure for obtaining a learning result to be used by the data processing device 20 according to the first embodiment.

First, the worker generates a dataset to be input to the network of the restoration unit 22 (step S11). In this operation, the input dataset uses a signal obtained by distorting a signal in a normal state output by the functional unit 21, using an arbitrary error model. The arbitrary error model can be provided, for example, by inverting at random a bit of data in an ongoing computation process or of an output, of a computation circuit included in the functional unit 21 for a case of occurrence of a software error. In addition, multiple datasets may be generated based on a parameter such as the occurrence probability or the continuous occurrence duration of a software error. Moreover, in a case in which the functional unit 21 performs computation based on multiple parameters, a dataset may be generated for all the expected combinations of the parameters to improve restoration precision.

Next, the worker generates a labeled training dataset (step S12). The labeled training dataset is related to a signal in a normal state output from the functional unit 21. In a case in which the input dataset includes different datasets for parameters of the functional unit 21, labeled training datasets are also generated for similar parameters. That is, the parameters of the functional unit 21 for generating the input dataset are the same as the parameters of the functional unit 21 for generating the labeled training dataset.

Finally, the network included in the restoration unit 22 learns the method of conversion of an input signal, i.e., detail of the conversion operation that has been performed, to minimize an error between data of a signal output in response to input of the input dataset and the labeled training dataset (step S13). The signal output in response to input of the input dataset is the signal obtained by performing conversion operation using an arbitrary conversion method on the input dataset. At step S13, the network repeatedly performs learning using various conversion methods obtained by, for example, changing the operational parameter to generate a learning model of detail of the conversion operation, i.e., a learning model of the conversion method. This operation enables the restoration unit 22 to restore a normal signal with a certain degree of precision by performing a conversion operation using the learning model even when a signal output from the functional unit 21 has been distorted due to an external factor.

In this respect, when it is assumed that a software error occurs in a stochastic manner, or stochastically, the restoration result output from the restoration unit 22 may be erroneous with respect to the waveform in a state in which no software error occurs. That is, when an input signal from the functional unit 21 has undergone no change (i.e., no error) caused by an external factor, performing a conversion operation on the input signal by the restoration unit 22 may rather increase the amount of error with respect to the signal in a normal state in which no software error occurs. Thus, the selection unit 23 compares feature quantities of two signals before and after the waveform restoration, that is, compares feature quantities of an input signal to the restoration unit 22 and of an output signal from the restoration unit 22, and selects and outputs one of these signals based on the comparison result of the feature quantities.

Figure 5:
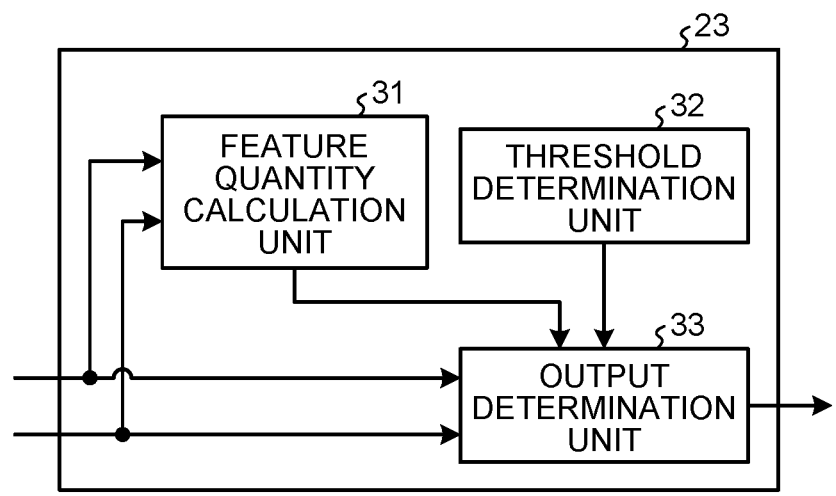
FIG. 5 is a diagram illustrating an example configuration of a selection unit included in the data processing device according to the first embodiment.

FIG. 5 is a diagram illustrating an example configuration of the selection unit 23 included in the data processing device 20 according to the first embodiment. The selection unit 23 according to the present embodiment includes a feature quantity calculation unit 31, a threshold determination unit 32, and an output determination unit 33.

The feature quantity calculation unit 31 calculates a feature quantity of each of a signal input to the selection unit 23 before undergoing the conversion operation in the restoration unit 22, and of a signal after undergoing the conversion operation in the restoration unit 22. The feature quantities in this operation are, for example, the amplitudes of the two respective signals input. Note that the feature quantity calculation unit 31 may calculate a feature quantity with respect to the comparison result on the two signals input, rather than calculating an individual feature quantity of each of the two signals input. The feature quantity calculation unit 31 outputs the feature quantity or feature quantities calculated, to the output determination unit 33.

Note that the following description refers to a signal before undergoing the conversion operation in the restoration unit 22 as unrestored signal, and a signal after undergoing the conversion operation in the restoration unit 22 as restored signal.

The threshold determination unit 32 determines a threshold for use in threshold-based selection of a signal performed by the output determination unit 33 based on a feature quantity or feature quantities. Note that in the determination of the threshold, a value leading to the highest restoration precision may be determined to be the threshold in advance using simulation or the like, or alternatively, the threshold may be dynamically changed during operation of the data processing device 20.

The output determination unit 33 performs a threshold-based determination on the feature quantity or feature quantities of the input signals calculated by the feature quantity calculation unit 31 using the threshold determined by the threshold determination unit 32, and selects and outputs either the unrestored signal or the restored signal.

Figure 6:
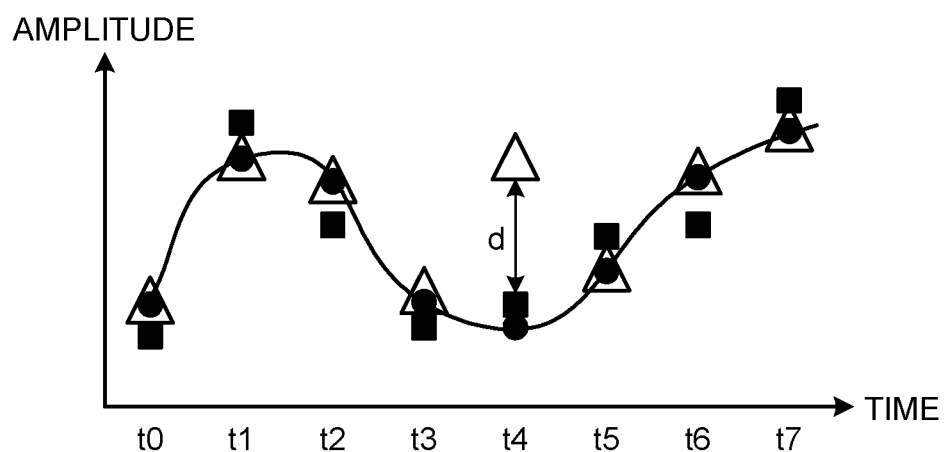
FIG. 6 is a diagram for describing an operation of the selection unit included in the data processing device according to the first embodiment.

An operation of the selection unit 23, specifically, an operation of selecting and outputting one of the unrestored signal and the restored signal input, will next be described with reference to FIG. 6. Note that FIG. 6 is a diagram for describing an operation of the selection unit 23 included in the data processing device 20 according to the first embodiment. In FIG. 6, the set of circles indicates the time waveform of a signal output by the functional unit 21 in a normal state. The set of triangles indicates the time waveform of a signal output by the functional unit 21 including an anomaly occurred at time t4 (i.e., unrestored signal), and the set of squares indicates the time waveform of a signal obtained by conversion operation performed by the restoration unit 22 (i.e., restored signal) on the signal including the anomaly occurred at time t4. In the example illustrated in FIG. 6, although the signal is a normal signal at times except time t4, the restoration unit 22 outputs a signal including an error. It is therefore desirable that the selection unit 23 select and output the signal indicated by a triangle at times except time t4. In contrast, the restoration unit 22 has restored the signal correctly to a certain degree at time t4, and it is therefore desirable that the selection unit 23 select and output the signal indicated by the square. Thus, the selection unit 23 selects a signal to be output, by using the amplitude of each of the signal indicated by the corresponding square and the signal indicated by the corresponding triangle, as the feature quantity. Specifically, the selection unit 23 selects and outputs the output of the restoration unit 22 (restored signal) in a case in which the difference between the feature quantities of the respective signals is greater than or equal to a threshold, that is, in a case in which an amplitude difference d between the restored signal and the unrestored signal is greater than or equal to the threshold, and otherwise selects and outputs the output of the functional unit 21 (unrestored signal).

Figure 7:
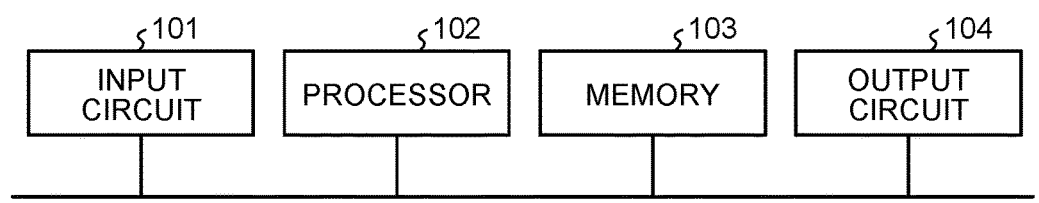
FIG. 7 is a diagram illustrating an example configuration of hardware that implements the data processing device according to the first embodiment.

Note that the data processing device 20 described with respect to the present embodiment can be implemented, for example, in processing circuitry configured as illustrated in FIG. 7, that is, by an input circuit 101, a processor 102, a memory 103, and an output circuit 104. The processor 102 is a central processing unit (CPU) (also known as a processing unit, a computing unit, a microprocessor, and a microcomputer). The memory 103 is, for example, a non-volatile or volatile semiconductor memory such as a random access memory (RAM), a read-only memory (ROM), a flash memory, an erasable programmable read-only memory (EPROM), or an electrically erasable programmable read-only memory (EEPROM) (registered trademark). The input circuit 101 is a circuit for receiving a signal from an external device, and the output circuit 104 is a circuit for providing a signal to an external device. The data processing device 20 can also be implemented using a dedicated hardware element such as an FPGA, an ASIC, or a digital signal processor (DSP) instead of using the processing circuitry illustrated in FIG. 7.

As described above, the data processing device 20 according to the present embodiment includes the functional unit 21, which performs a computational operation required of a device to be used; the restoration unit 22, which performs a restoration operation for restoring the computational operation result from the functional unit 21 to the software error free state; and the selection unit 23, which calculates a feature quantity based on an unrestored signal, which is a signal input from the functional unit 21 to the restoration unit 22, and on a restored signal, which is a signal output by the restoration unit 22, and selects and outputs either the unrestored signal or the restored signal based on the feature quantity. The restoration unit 22 learns in advance an error occurrence model regarding a software error that may occur in the functional unit 21, and restores the waveform of the input signal to a software error free state using a learning model, which is the learning result. This enables the data processing device 20 to provide restoration to an error free signal upon occurrence of a software error, and also to output an unrestored signal instead of outputting a restored signal that may include an error when no software error has occurred. In addition, software error correction functionality can be provided while reducing an increase in the circuit size. Moreover, use of the data processing device 20 enables a consumer device, which is less resistant to a cosmic ray, to be used in space applications, thereby allowing improvement in communication performance and reduction in cost of an artificial satellite including a transmission device and a reception device. Note that use of the data processing device 20 in at least one of the transmission device and the reception device installed in an artificial satellite can provide advantages such as improvement in communication performance and reduction in cost.

Note that the present embodiment has been described on an assumption of a system configured as illustrated in FIGS. 1 and 2, specifically, a satellite communication system in which two of the ground-based terminals 2 communicate with each other via the artificial satellite 1. However, the satellite communication system may be configured such that a single ground-based terminal 2 communicates with the artificial satellite 1.

Second Embodiment

The first embodiment has been described with respect to the data processing device 20 having functionality to restore signal distortion caused by an external factor, and to output a resulting signal. However, for example, a software error caused by a cosmic ray in a cosmic environment does not necessarily occur with a constant probability, and distortion may increase cumulatively. Then, a signal distortion at or above a certain value may eliminate correlation with a waveform that has previously been learned in the restoration unit, thereby presenting a problem in that the waveform is unable to be restored correctly. In such situation, the signal restoration circuit is desirably brought to the normal state using a different method depending on the state of the signal. Thus, the present embodiment will be described with respect to a data processing device capable of bringing the signal restoration circuit to a normal state depending on the level of effect of the external factor.

Figure 8:
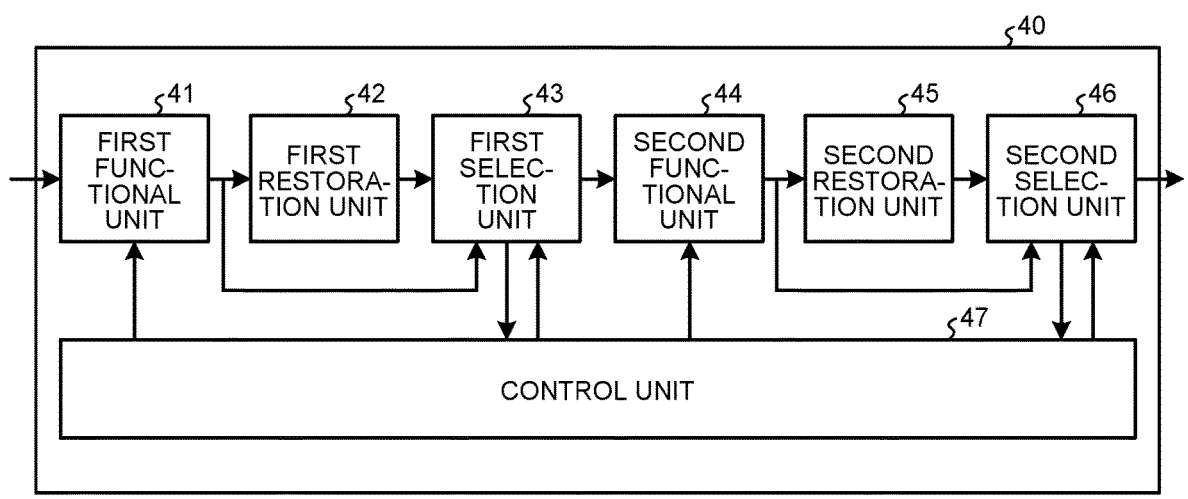
FIG. 8 is a diagram illustrating an example configuration of a data processing device according to a second embodiment.

FIG. 8 is a diagram illustrating an example configuration of a data processing device 40 according to a second embodiment. The data processing device 40 according to the second embodiment includes a first functional unit 41, a first restoration unit 42, a first selection unit 43, a second functional unit 44, a second restoration unit 45, a second selection unit 46, and a control unit 47. In this respect, the first functional unit 41 and the second functional unit 44 are configured similarly to the functional unit 21 of the data processing device 20 according to the first embodiment. In addition, the first restoration unit 42 and the second restoration unit 45 are configured similarly to the restoration unit 22 of the data processing device 20 according to the first embodiment. Note also that FIG. 8 illustrates an example configuration in which the data processing device 40 according to the second embodiment includes two sets of the functional unit, the restoration unit, and the selection unit, but the configuration is not limited thereto. The data processing device 40 may be configured to include one set or three or more sets of the functional unit, the restoration unit, and the selection unit. Note that the term "functional units of the data processing device 40" refers to the first functional unit 41 and the second functional unit 44. The term "restoration units of the data processing device 40" refers to the first restoration unit 42 and the second restoration unit 45. The term "selection units of the data processing device 40" refers to the first selection unit 43 and the second selection unit 46.

Figure 9:
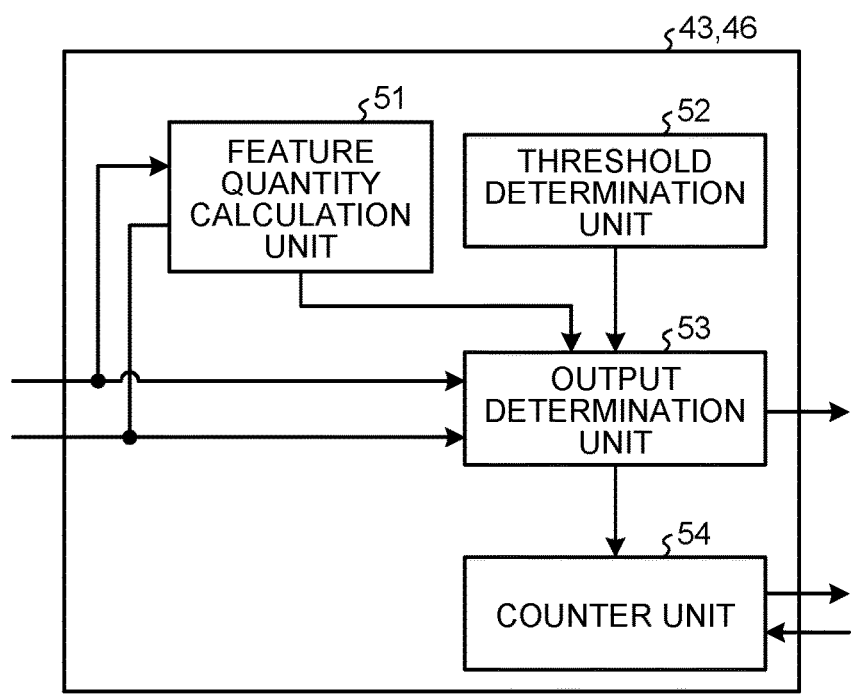
FIG. 9 is a diagram illustrating an example configuration of a first selection unit and of a second selection unit of the data processing device according to the second embodiment.

FIG. 9 is a diagram illustrating an example configuration of the selection units, i.e., the first selection unit 43 and the second selection unit 46, of the data processing device 40 according to the second embodiment. The first selection unit 43 and the second selection unit 46 each include a feature quantity calculation unit 51, a threshold determination unit 52, an output determination unit 53, and a counter unit 54. The feature quantity calculation unit 51, the threshold determination unit 52, and the output determination unit 53 are identical respectively to the feature quantity calculation unit 31, the threshold determination unit 32, and the output determination unit 33 of the selection unit 23 included in the data processing device 20 according to the first embodiment. That is, the first selection unit 43 and the second selection unit 46 are each configured to additionally include the counter unit 54 with respect to the selection unit 23 included in the data processing device 20 according to the first embodiment. Description of the feature quantity calculation unit 51, the threshold determination unit 52, and the output determination unit 53 will therefore be omitted.

The counter unit 54 of the first selection unit 43 and of the second selection unit 46 maintains or updates (i.e., increments) a counter value based on the determination result from the output determination unit 53, and provides the resulting counter value to the control unit 47. Specifically, the counter unit 54 increments the counter value in a case in which a feature quantity calculated by the feature quantity calculation unit 51 is greater than or equal to a threshold, that is, in a case in which the output determination unit 53 determines that the upstream restoration unit (i.e., the first restoration unit 42 or the second restoration unit 45) has detected a signal distortion such as bit inversion, and has therefore made restoration, and thus outputs a restored signal.

Figure 10:
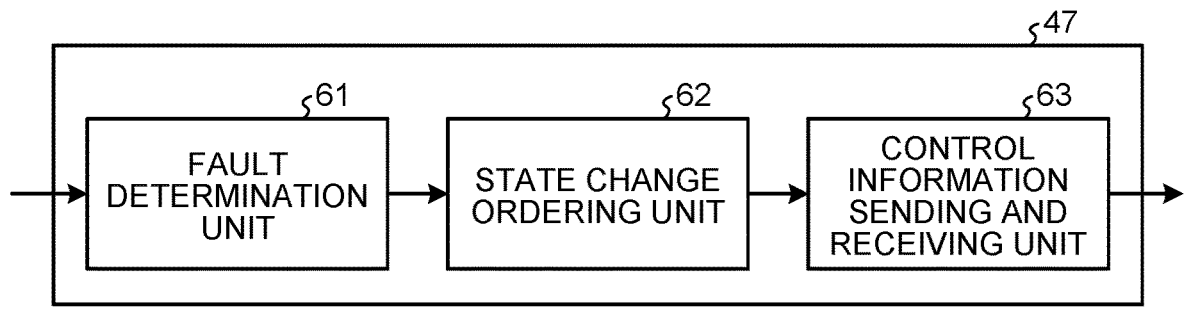
FIG. 10 is a diagram illustrating an example configuration of a control unit of the data processing device according to the second embodiment.
Figure 11:
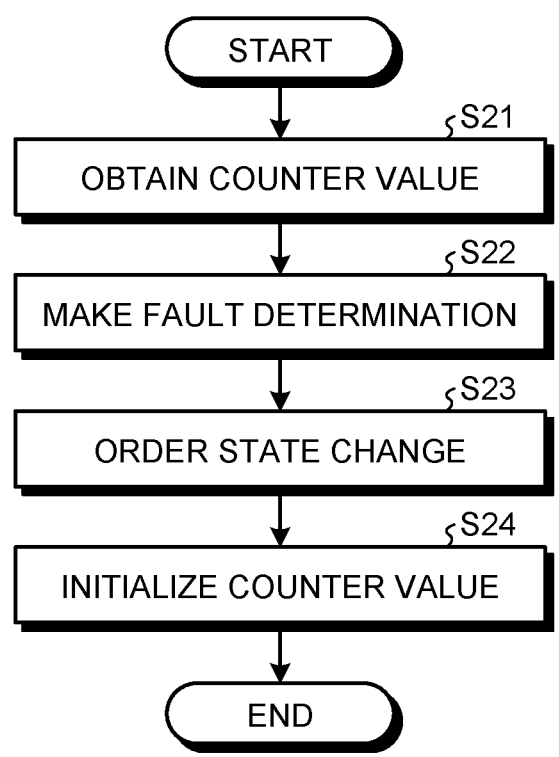
FIG. 11 is a flowchart illustrating an example of operation of the control unit of the data processing device according to the second embodiment.

FIG. 10 is a diagram illustrating an example configuration of the control unit 47 of the data processing device 40 according to the second embodiment. The control unit 47 includes a fault determination unit 61, a state change ordering unit 62, and a control information sending and receiving unit 63. FIG. 11 is a flowchart illustrating an example of operation of the control unit 47 of the data processing device 40 according to the second embodiment.

An operation of the control unit 47 will next be described with reference to FIGS. 10 and 11. The fault determination unit 61 of the control unit 47 obtains the counter value output from the counter unit 54 of each of the first selection unit 43 and the second selection unit 46 (step S21). The fault determination unit 61 then determines the fault status of each of the first functional unit 41 and the second functional unit 44 based on the corresponding counter value (step S22). The fault status can be determined, for example, using the amount of increase in the counter value in a cycle time. The fault determination unit 61 makes a determination using, for example, a method of determining the fault status by comparing the amount of increase in the counter value with a predetermined threshold, a method of determining the fault status by comparing the difference between the latest amount of increase in the counter value and the average value of previous amounts of increase in the counter value with a threshold, or another method. Note that the fault determination unit 61 determines the individual fault statuses with respect to the first functional unit 41 and the second functional unit 44 respectively based on a first counter value, which is the counter value obtained from the first selection unit 43, and on a second counter value, which is the counter value obtained from the second selection unit 46. That is, the fault determination unit 61 determines the fault status of the first functional unit 41 using the first counter value, and determines the fault status of the second functional unit 44 using the second counter value.

After the fault determination unit 61 determines the fault status (normal or fault) of each of the first functional unit 41 and the second functional unit 44, the state change ordering unit 62 orders the functional unit that has been determined to be in a fault state to change and restore the operational state thereof to a normal state (step S23). At this step S23, the state change ordering unit 62 may restore normal operation, for example, by ordering the applicable functional unit to perform resetting, or by restructuring the circuit, i.e., overwriting the circuit, of the applicable functional unit. Note that to order a state change, the state change ordering unit 62 generates control information representing detail of the order, and outputs the control information to the control information sending and receiving unit 63, and the control information sending and receiving unit 63 then sends the control information input, to the corresponding functional unit (i.e., the first functional unit 41 or the second functional unit 44). Alternatively, instead of ordering a functional unit to change the operational state thereof, the state change ordering unit 62 may order the applicable restoration unit (i.e., the first restoration unit 42 or the second restoration unit 45) to change factors of a network serving as the learning model to restore the state in which a software error can be corrected.

Finally, the state change ordering unit 62 orders the applicable counter unit 54 to initialize the counter value (step S24). Note that if the fault determination unit 61 determines, at step S22 described above, that the first functional unit 41 and the second functional unit 44 are both in a normal state, the state change ordering unit 62 terminates the process illustrated in FIG. 11 without performing step S23 or step S24 described above.

The control unit 47 repeats the process of steps S21 to S24 illustrated in FIG. 11 with a predetermined constant period.

Note that in a case in which the present embodiment is applied to a device installed on an artificial satellite, e.g., the relay device 10 illustrated in FIG. 2, the foregoing operation of the fault determination unit 61 and of the state change ordering unit 62 may be performed in the control unit 47 included in the device installed on the artificial satellite, or a similar operation may be performed in a control unit included in a ground-based device configured to transmit and receive the control information via the control information sending and receiving unit 63.

As described above, the data processing device 40 according to the present embodiment includes a functional unit, which performs a computational operation required of a device to be used; a restoration unit, which performs a restoration operation for restoring the computational operation result from the functional unit to a software error free state; a selection unit, which calculates a feature quantity based on a signal before the restoration operation is performed by the restoration unit (unrestored signal), and on a signal after the restoration operation is performed by the restoration unit (restored signal), and selects and outputs either the unrestored signal or the restored signal based on the feature quantity; and a control unit, which controls the functional unit. The selection unit of the data processing device 40 counts the number of times of outputting the restored signal. The control unit determines whether the functional unit is in a normal state or in a fault state based on the number of times of outputting the restored signal, and upon detection of a fault state, provides control to restore the functional unit to the normal operation. This enables restoration to a state in which a signal can be restored even when signal distortion that has gradually increased reaches a state in which restoration is difficult. For example, use of the data processing device 40 in a communication device enables stable communication to be provided even in an environment where a software error may occur.

The disclosure provides an advantage in that it is possible to provide a data processing device that is capable of correcting a software error while reducing an increase in the circuit size.

The configurations described in the foregoing embodiments are merely examples. These configurations may be combined with a known other technology, and moreover, a part of such configurations may be omitted and/or modified without departing from the spirit.

What is claimed is:

1. A data processing device comprising:

a restoration circuitry to perform a conversion operation on an input signal to convert the input signal into a signal having no distortion caused by an external factor; and a selector to select and output either an unrestored signal or a restored signal based on a feature quantity of the unrestored signal and on a feature quantity of the restored signal, the unrestored signal being the input signal, the restored signal being a signal obtained by the restoration circuitry by performing the conversion operation, wherein the restoration circuitry learns in advance detail of the conversion operation using the input signal having distortion caused by an external factor and the input signal having no distortion caused by an external factor to generate a learning model, performs the conversion operation on the input signal using the learning model, and updates the learning model when the number of times the selector selects and outputs the restored signal reaches a predetermined value.

2. The data processing device according to claim 1, wherein the selector makes a comparison between the feature quantity of the unrestored signal and the feature quantity of the restored signal, and selects and outputs either the unrestored signal or the restored signal based on a result of the comparison.

3. The data processing device according to claim 2, wherein the selector selects and outputs the restored signal when a difference between the feature quantity of the unrestored signal and the feature quantity of the restored signal is greater than or equal to a predetermined threshold.

4. The data processing device according to claim 1, wherein the feature quantities are each an amplitude of a signal.

5. A transmission device comprising the data processing device according to claim 1.

6. An artificial satellite comprising the transmission device according to claim 5.

7. A reception device comprising the data processing device according to claim 1.

8. An artificial satellite comprising the reception device according to claim 7.

9. A data processing device comprising:

a restoration circuitry to perform a conversion operation on an input signal to convert the input signal into a signal having no distortion caused by an external factor;

a selector to select and output either an unrestored signal or a restored signal based on a feature quantity of the unrestored signal and on a feature quantity of the restored signal, the unrestored signal being the input signal, the restored signal being a signal obtained by the restoration circuitry by performing the conversion operation;

a functional circuitry to perform a computational operation required of a device to be used to generate the input signal; and a control circuitry to control the functional circuitry based on a result of operation performed by the selector, wherein the control circuitry determines whether the functional circuitry is operating normally, based on the number of times the selector selects and outputs the restored signal, and orders the functional circuitry to change an operational state to restore the functional circuitry to a normal operational state when the functional circuitry is not operating normally.

10. The data processing device according to claim 9, comprising:

a plurality of sets of the functional circuitry, the restoration circuitry, and the selector, wherein the control circuitry determines individual operational states of the respective plurality of functional circuitries, and orders a functional circuitry determined to not be operating normally to change an operation.

11. The data processing device according to claim 9, wherein the selector makes a comparison between the feature quantity of the unrestored signal and the feature quantity of the restored signal, and selects and outputs either the unrestored signal or the restored signal based on a result of the comparison.

12. The data processing device according to claim 11, wherein the selector selects and outputs the restored signal when a difference between the feature quantity of the unrestored signal and the feature quantity of the restored signal is greater than or equal to a predetermined threshold.

13. The data processing device according to claim 9, wherein the feature quantities are each an amplitude of a signal.

14. A transmission device comprising the data processing device according to claim 9.

15. An artificial satellite comprising the transmission device according to claim 14.

16. A reception device comprising the data processing device according to claim 9.

17. An artificial satellite comprising the reception device according to claim 16.

18. A data processing method comprising:

a restoration of performing a conversion operation on an input signal using a learning model to convert the input signal into a signal having no distortion caused by an external factor;

a selection of selecting and outputting either an unrestored signal or a restored signal based on a feature quantity of the unrestored signal and on a feature quantity of the restored signal, the unrestored signal being the input signal, the restored signal being a signal obtained by the restoration by performing the conversion operation;

a model generation of learning detail of the conversion operation using the input signal having distortion caused by an external factor and the input signal having no distortion caused by an external factor to generate the learning model; and a model update of updating the learning model when the number of times the restored signal is selected and output at the selection reaches a predetermined value.

* * * * *